US009223615B2

(12) United States Patent
Shin et al.

(10) Patent No.: US 9,223,615 B2
(45) Date of Patent: *Dec. 29, 2015

(54) APPARATUS AND METHOD FOR THREAD PROGRESS TRACKING

(75) Inventors: Young Sam Shin, Hwaseong-si (KR); Seung Won Lee, Hwaseong-si (KR); Min Young Son, Yongin-si (KR); Shi Hwa Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 547 days.

This patent is subject to a terminal disclaimer.

(21) Appl. No.: 13/588,228

(22) Filed: Aug. 17, 2012

(65) Prior Publication Data

US 2013/0097613 A1 Apr. 18, 2013

(30) Foreign Application Priority Data

Oct. 12, 2011 (KR) .......................... 10-2011-0104061

(51) Int. Cl.
*G06F 9/46* (2006.01)
*G06F 9/48* (2006.01)
*G06F 11/34* (2006.01)
*G06F 11/36* (2006.01)
*G06F 9/30* (2006.01)

(52) U.S. Cl.
CPC ............ *G06F 9/485* (2013.01); *G06F 9/30123* (2013.01); *G06F 11/3409* (2013.01); *G06F 11/3466* (2013.01); *G06F 11/3636* (2013.01); *G06F 2209/508* (2013.01)

(58) Field of Classification Search
None
See application file for complete search history.

(56) References Cited

U.S. PATENT DOCUMENTS

| 4,928,000 | A | * | 5/1990 | Eglise et al. | ................... | 235/380 |
| 5,790,843 | A | * | 8/1998 | Borkenhagen et al. | ........ | 712/226 |
| 5,987,598 | A | * | 11/1999 | Levine et al. | ................. | 712/227 |
| 6,076,157 | A | | 6/2000 | Borkenhagen et al. | | |
| 6,098,169 | A | | 8/2000 | Ranganathan | | |
| 6,978,460 | B2 | * | 12/2005 | Arakawa | ........................ | 718/103 |
| 7,441,101 | B1 | * | 10/2008 | Steiss et al. | ................... | 712/205 |
| 2003/0233394 | A1 | * | 12/2003 | Rudd et al. | ..................... | 709/107 |

(Continued)

FOREIGN PATENT DOCUMENTS

| KR | 10-2004-0068721 A | 8/2001 |
| KR | 10-2010-0005686 A | 1/2010 |

OTHER PUBLICATIONS

Marek Olszewski et al., "Kendo: Efficient Deterministic Multithreading in Software", ASPLOS 2009, pp. 1-12.

(Continued)

*Primary Examiner* — Hiren Patel
(74) *Attorney, Agent, or Firm* — NSIP Law

(57) ABSTRACT

Provided is a method and apparatus for measuring a progress or a performance of an application program in a computing environment using a micro-architecture. An apparatus for thread progress tracking may select a thread included in an application program, may determine, based on a predetermined criterion, whether an execution scheme for at least one instruction included in the thread corresponds to an effective execution scheme in which an execution time is uniform or a non-effective execution scheme in which a delayed cycle is included and the execution time is non-uniform, and may generate an effective progress index (EPI) by accumulating an execution time of an instruction executed by the effective execution scheme other than an instruction executed by the non-effective execution scheme.

21 Claims, 13 Drawing Sheets

(56) References Cited

U.S. PATENT DOCUMENTS

| | | | |
|---|---|---|---|
| 2004/0143655 A1* | 7/2004 | Narad et al. | 709/223 |
| 2004/0172582 A1* | 9/2004 | Gemelli et al. | 714/781 |
| 2005/0243734 A1* | 11/2005 | Nemirovsky et al. | 370/252 |
| 2006/0230317 A1* | 10/2006 | Anderson | 714/38 |
| 2006/0259704 A1* | 11/2006 | Wyman | 711/141 |
| 2007/0083871 A1* | 4/2007 | McKenney | 718/105 |
| 2008/0104610 A1* | 5/2008 | Norton et al. | 718/108 |
| 2009/0106539 A1 | 4/2009 | Mericas | |
| 2009/0178041 A1* | 7/2009 | Friess et al. | 718/100 |
| 2011/0055479 A1* | 3/2011 | West et al. | 711/118 |
| 2011/0067015 A1* | 3/2011 | Takagi et al. | 717/149 |
| 2011/0151838 A1* | 6/2011 | Olincy et al. | 455/412.1 |
| 2012/0023505 A1* | 1/2012 | Shin et al. | 718/108 |
| 2014/0032976 A1* | 1/2014 | Shin et al. | 714/47.1 |

OTHER PUBLICATIONS

Brinkley Sprunt, "The Basics of Performance-Monitoring Hardware", Jul. 2002, pp. 64-71, IEEE Micro, v.22 n.4.

Henry Hoffman et al., "Application Heartbeats for Software Performance and Health", Technical Report 2009, pp. 1-12.

\* cited by examiner

APPARATUS AND METHOD FOR THREAD PROGRESS TRACKING

CROSS-REFERENCE TO RELATED APPLICATIONS

This application claims the priority benefit of Korean Patent Application No. 10-2011-0104061, filed on Oct. 12, 2011, in the Korean Intellectual Property Office, the disclosure of which is incorporated herein by reference.

BACKGROUND

1. Field

Example embodiments relate to a method and apparatus for measuring a progress or a performance of an application that performs a data processing and a predetermined function in a computing environment using micro-architecture.

2. Description of the Related Art

Due to propagation of personal mobile terminals and an increased amount of processing information, computing devices may process relatively complex and varied applications simultaneously. An increase in a number of applications, such as a multimedia using a real-time process, may entail an increased number of requirements for system performance of the computing devices and thus, a single processor may not process the applications efficiently.

To handle issues described in the foregoing, a semiconductor integration technology and a multi-processor computing technology have been introduced. Using multiple processors may have merits in terms of energy efficiency and performance enhancement when compared to the single processor. However, design and development of a system using the multiple processors may be difficult, and in particular, verification of a system having concurrency may be difficult. A verification cost of the system having concurrency may increase in proportion to a number of cores of a development period of a conventional successive system raised to a second power. Various schemes have been introduced to reduce the verification cost, and a function basically used for embodying the various schemes effectively may correspond to accurately measuring a performance and progress of an application program that performs various instructions.

SUMMARY

The foregoing and/or other aspects are achieved by providing an apparatus for thread progress tracking, the apparatus including a selector to select a thread included in an application program, a controller to determine, based on a predetermined criterion, whether an execution scheme for at least one instruction included in the thread corresponds to an effective execution scheme in which an execution time is uniform or a non-effective execution scheme in which a delayed cycle is included and the execution time is non-uniform, and an effective progress counter (EPC) to generate an effective progress index (EPI) by accumulating an execution time of an instruction executed by the effective execution scheme other than an instruction executed by the non-effective execution scheme.

The non-effective execution scheme may include a hardware non-effective execution (HWNE) scheme that executes an instruction by the non-effective execution scheme at an instruction level of a processor based on hardware, and a software non-effective execution (SWNE) scheme that executes a function by the non-effective execution scheme at a function level including instructions based on software.

The apparatus may further include a memory progress counter (MPC) to generate a memory progress index (MPI) by accumulating a cycle expended to access a shared memory while the thread occupies a processor, and the thread is executed.

The apparatus may further include a kernel progress counter (KPC) to generate a kernel progress index (KPI) by accumulating a cycle expended to operate a system kernel while the thread occupies a processor and the thread is executed.

The apparatus may further include an input-output progress counter (IOPC) to generate an input-output progress index (IOPI) by accumulating a cycle used for repeatedly verifying input and output states to execute input-output code of input/output (I/O) data while the thread occupies a processor, and the thread is executed.

The EPC may perform a count based on a system clock in response to the execution scheme being determined to be the effective execution scheme.

An operation of the EPC may be controlled by an HWNE signal that executes an instruction via the non-effective execution scheme at an instruction level of a processor based on hardware, or an SWNE signal that executes a function via the non-effective execution scheme at a function level including instructions based on software.

The HWNE signal may be generated based on a stall signal occurring in a processor.

The SWNE signal may be generated using an application programming interface (API) when executing a user function including instructions.

The EPC may include a determining unit to determine to set an SWNE signal so as to prevent the EPC from operating when the thread is in a non-running state.

The determining unit may set the SWNE signal to prevent the EPC from operating in response to an interrupt occurring in the thread that is in a running state, and may clear the SWNE signal so that the EPC operates in response to the thread being in a running state after performing an interrupt service routine. The EPC may be located in a processor unit.

The apparatus may further include a memory to store an EPI corresponding to a thread for each thread, and a copying unit to copy a current value of the EPC to be the EPI in the memory when the thread is in a running state.

The apparatus may further include a copying unit to copy a value of the EPC to be the EPI in a memory at a point in time at which a first thread context-switches to a second thread, and a loading unit to load the EPI copied in the memory to the EPC in response to the second thread context-switching back to the first thread.

The apparatus may further include a set determining unit to determine whether a flag value set to indicate that a non-effective function, in use, is set in a thread control block of the thread on a scheduler.

The set determining unit may suspend the EPC by setting an SWNE signal when the flag value is set, and may correct an increment of an EPC not used for effectively executing code of a thread when the flag value fails to be set.

The foregoing and/or other aspects are achieved by providing a method for thread progress tracking, the method including selecting a thread included in an application program, determining, based on a predetermined criterion, whether an execution scheme for at least one instruction included in the thread corresponds to an effective execution scheme in which an execution time is uniform or a non-effective execution scheme in which a delayed cycle is included and the execution time is non-uniform, and generating an EPI based on an EPC that accumulates an execution time of an instruction executed by the effective execution scheme other than an instruction executed by the non-effective execution scheme.

An operation of the EPC may be controlled by an HWNE signal that executes an instruction via the non-effective execution scheme at an instruction level of a processor based on hardware, or an SWNE signal that executes a function via the non-effective execution scheme at a function level including instructions based on software.

The method may further include storing, in a memory, the EPI corresponding to a thread for each thread, and copying a current value of the EPC to be the EPI in the memory when the thread is in a running state.

The method may further include copying a value of the EPC to be the EPI in a memory at a point in time at which a first thread context-switches to a second thread, and loading the EPI copied in the memory to the EPC in response to the second thread context-switching back to the first thread.

The foregoing and/or other aspects are achieved by providing a method for thread progress tracking, the method including selecting a thread prepared according to an instruction to be executed on a scheduler, setting an EPI stored in the thread to an initial value of an EPC, and setting a KPI stored in the thread to an initial value of a KPC, determining whether a flag value set to indicate that a non-effective function, in use, is set in a thread control block of the thread, suspending the EPC by setting an SWNE signal, and operating the KPC by setting a KPSW signal when the flag value is set, and correcting an increment of an EPC not used for effectively executing code of the thread, operating the suspended EPC by clearing the SWNE signal, and suspending the KPC by clearing the KPSW signal when the flag value fails to be set.

The foregoing and/or other aspects are achieved by providing a method for thread progress tracking, the method including suspending an EPC by setting an SWNE signal, and operating a KPC by setting a KPSW signal in response to a schedule event occurring in a thread in a running state, storing a value of the suspended EPC to be a value of an EPI in a memory in response to a context switch event occurring in a state in which the EPC is suspended, and correcting an increment of an EPC not used for effectively executing code of the thread, operating the suspended EPC by clearing the SWNE signal, and suspending the KPC by clearing the KPSW signal in response to the schedule event being terminated in a state in which the EPC is suspended.

According to example embodiments, it is possible to effectively manage a thread and system resource since a progress of a thread included in an application program may be predicted using an apparatus for thread progress tracking.

The example embodiments may include an EPC that may perform a calculation relatively easily and thus, deterioration in performance due to a management may seldom occur, and may be embodied with a relatively low cost by adding, to an existing counter, operation and suspension functions by an SWNE signal and an HWNE signal.

The example embodiments may also include an apparatus for thread progress tracking that may provide a relatively precise thread progress index at a processor cycle level, thereby accurately managing a thread during a multi-threading.

The example embodiments may also include an apparatus for thread progress tracking that may provide, with a fewest number of runtime overheads, an effective execution period of programs parallel-processed in a multi-processor state.

The example embodiments may also include an apparatus for thread progress tracking that may provide a relatively precise thread progress index, thereby providing a predictable system control function, and may efficiently perform an efficient load distribution and a low power management function.

The example embodiments may also include an apparatus for thread progress tracking that may be used for effective verification of a system having a concurrency since a progress of a thread is accurately predicted through an EPI.

The example embodiments may also include an apparatus for thread progress tracking that may provide information about an effective performance rate of a thread, a shared resource efficiency of a thread, and a kernel shared resource efficiency of a thread.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
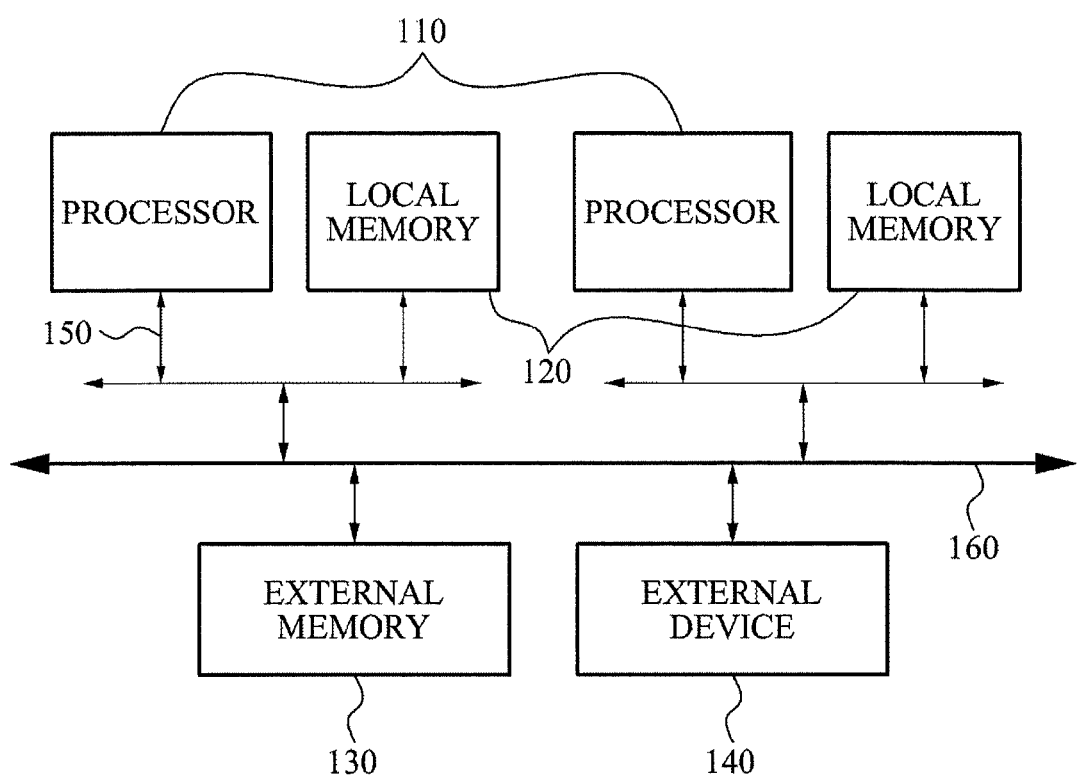
FIG. 1 illustrates a computing environment in which a general application program is performed according to a conventional art.

Reference will now be made in detail to embodiments, examples of which are illustrated in the accompanying drawings, wherein like reference numerals refer to the like elements throughout. Embodiments are described below to explain the present disclosure by referring to the figures.

When it is possible to accurately measure a performance and progress of an application being executed, a measured value may be used as an indicator to be utilized in enhancing a performance of a thread, balancing a load, and managing low power. When a collision state of resources shared in a system is efficiently monitored and expressed as an indicator, the indicator may be used as significant information in determining a resource allocation, a redistribution, and a scheduling used for performing the application program. An issue may be a type of the indicator to be generated and used for efficiently distributing resources.

It may be difficult to accurately and precisely measure a state of the application program while preventing a decrease in a run time performance. An execution time of instructions executed by the application program may be non-uniform. Further, it may be difficult to accurately measure the state of the application program due to an unexpected effect of other application programs performed concurrently with the application program. When the application program corresponds to a single application program, several threads included in the single application program may be concurrently executed to affect each other and thus, it may be difficult to accurately measure the state of the application program. When the application program corresponds to a single thread, an execution time of instructions included in the single thread may be non-uniform and thus, it may be difficult to accurately measure the state of the application program.

A conventional method of measuring a progress of the application program may include a method of inserting additional code and a method of using a performance counter. The method of inserting additional code may be embodied relatively easily. However, obtaining a precise measurement of a progress of the application program may be difficult due to a runtime overhead resulting from an insertion. The method of using a performance counter may be embodied at a relatively low cost. However, a retired instruction event may be used and thus, a difference in a clock rate may occur between threads. Measuring an indicator with a relatively high precision by increasing a rate of a virtual clock may involve an interruption overhead of a performance counter, which may decrease a performance of the application program. Accordingly, there is a desire for a method of measuring a progress of an application program that may reflect a precise and accurate thread progress, and may involve relatively low runtime overhead and a relatively low embodiment cost.

FIG. 1 illustrates a computing environment in which a general application program is performed according to a conventional art.

In general, an application program may perform a predetermined function using a memory and a hardware device as resources on a processor 110. The memory may have a hierarchical structure. In this instance, a memory having a relatively high access speed may be included in a local bus 150, and the memory included in the local bus due to a relatively high access speed may be defined as an internal memory or a local memory 120. An inexpensive memory having a relatively low access speed may be included on a system bus 160. The memory having a relatively low access speed and included on the system bus may be defined as an external memory 130. The system bus 160 may be used as a path for an external device 140. In this instance, multiple processors may integrate several processors in a single system and parallel-process an application to satisfy requirements for a relatively high performance.

In general, an application may include at least one thread. Thus, multiple threads may be performed on a single processor, which may be referred to as multithreading. To measure a performance and a progress of the application program, a performance and a progress of a thread included in the application program may be measured. FIG. 1 illustrates an example of a general computing environment, and an environment to which an apparatus for thread progress tracking is applied according to example embodiments may not be limited to the example illustrated in FIG. 1.

Figure 2:
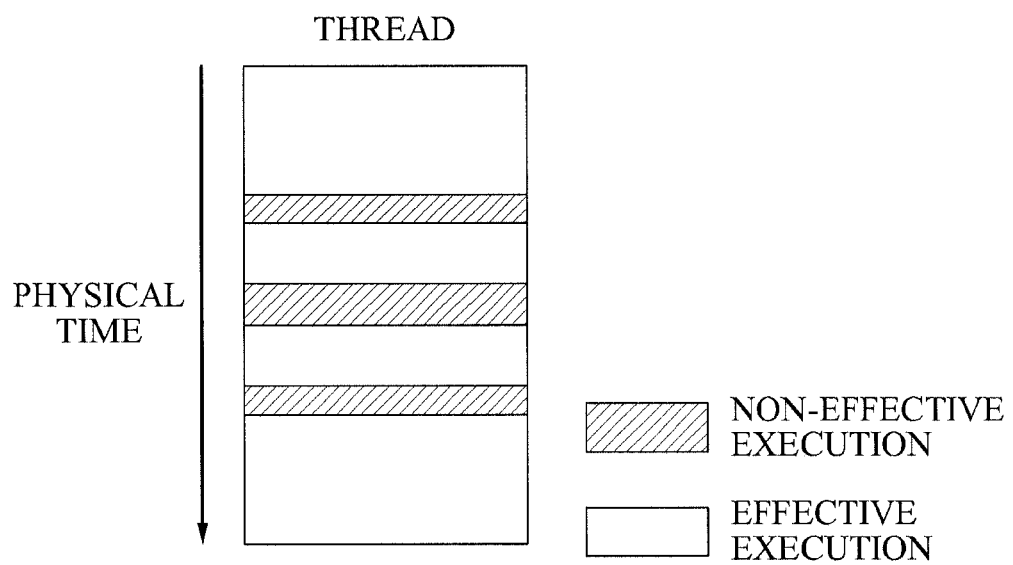
FIG. 2 illustrates instructors classified into an effective execution and a non-effective execution that perform a function of an application program according to example embodiments.

FIG. 2 illustrates instructors classified into an effective execution and a non-effective execution that perform a function of an application program according to example embodiments.

An application program may include a plurality of threads. A thread may include instructions for executing a predetermined function. An execution scheme of an instruction may be classified into an effective execution scheme and a non-effective execution scheme.

When the execution scheme of an instruction corresponds to the effective execution scheme, a point in time at which an execution of an instruction is terminated, or a point in time at which an execution of an instruction group is terminated, may have a uniform cycle. Most instructions executed in the effective execution scheme may be executed independently from an external environment of a processor. Instructions executed in the effective execution scheme may correspond to a case in which execution cycles of the corresponding instructions are indispensable for a progress of a program. The execution cycles of the corresponding instructions may be measured in terms of processor cycles used for executing instructions effectively, as intended by an application.

When the execution scheme of an instruction corresponds to the non-effective execution scheme, a point in time at which an execution of an instruction or an instruction group is terminated may have a non-uniform delayed cycle. Most instructions executed in the non-effective execution scheme may correspond to cases of using a shared resource such as input and output ends, a memory, and the like. When instructions in the non-effective execution scheme are executed in a processor, a delay of several tens of cycles may be required to terminate an execution of the corresponding instructions. The delay may occur when the corresponding instruction is executed, and a shared resource that a processor desires to access is being used by another processor. In this instance, a collision may occur between processors due to concurrent access to a shared resource, subsequently causing the delay.

Referring to FIG. 2, a physical time during which a thread is executed may increase at a predetermined rate. In this instance, an increase of the physical time may be indicated by a real progress index (RPI).

An execution of instructions in the effective execution scheme may be terminated within the uniform execution time. An execution of instructions in the non-effective execution scheme may be non-uniformly terminated due to an effect of other threads or a circumstance occurring with respect to a point in time of an execution.

The non-effective execution may be classified into a hardware non-effective execution (HWNE) that performs a non-effective execution at an instruction level of a processor, and a software non-effective execution (SWNE) that performs a non-effective execution by events occurring while executing an application program at a kernel level of a system or a function including instructions. Here, a kernel of a system may refer to a system program included in an operating system rather than a general user application program. The HWNE and the SWNE may be classified based on a predetermined criterion.

An execution time of a portion other than the SWNE and the HWNE in an execution time of an actual thread may correspond to an effective execution time. Since a cycle used for executing a portion other than the HWNE and the SWNE has the same value at any time in executing a thread, indicators of the portion other than the HWNE and the SWNE may be used for an effective execution indicator of the thread. Here, an indicator indicating an effective execution time may be referred to as an effective progress index (EPI). The EPI may be expressed by the following equations.

$$P_{thread} = P_{effective\ execution} + P_{non\text{-}effective\ execution}$$

$$T_{effective\ thread\ progress} = T_{physical} - (T_{SWNE} + T_{HWNE})$$

Here, $P_{thread}$ corresponding to a program included in an application may be classified into $P_{effective\ execution}$ corresponding to an effective execution and $P^{non\text{-}effective\ execution}$ corresponding to a non-effective execution. A time interval $T_{effective\ thread\ progress}$ indicating an effective progress of a thread may be obtained by subtracting $T_{SWNE}$ corresponding to an execution time of the SWNE from $T_{HWNE}$ corresponding to an execution time of the HWNE from $T_{physical}$ corresponding a physical time for executing a thread.

Figure 3:
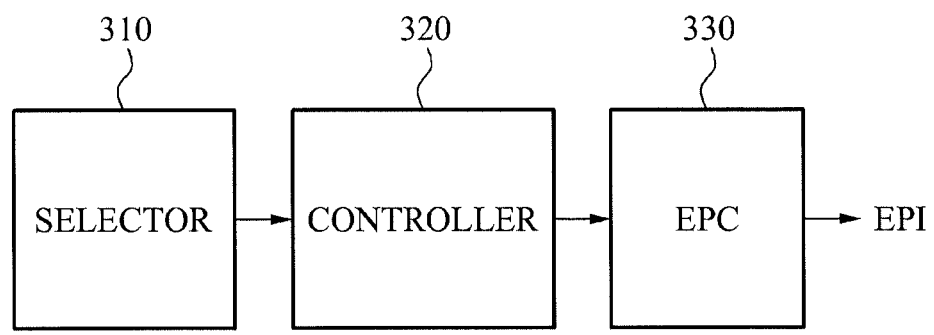
FIG. 3 illustrates an apparatus for thread progress tracking according to example embodiments.

FIG. 3 illustrates an apparatus for thread progress tracking according to example embodiments.

Referring to FIG. 3, an apparatus for thread progress tracking according to example embodiments includes a selector 310, a controller 320, and an effective progress counter (EPC) 330.

The selector 310 may select at least one thread included in an application program. The selector 310 may select a thread capable of executing an application program desired by a user among threads included in the application program.

The controller 320 may determine whether an execution scheme for each instruction included in the thread corresponds to an effective execution scheme in which an execution time is uniform or a non-effective execution scheme in which a delayed cycle is included and the execution time is non-uniform.

The controller 320 may determine, based on a predetermined criterion, whether an execution scheme for each instruction included in the thread corresponds to an effective execution scheme or a non-effective execution scheme. Here, the predetermined criterion may be defined by whether the execution time of an instruction has a uniform cycle, or may be defined by whether an instruction is effective for intent of the application program. An effective instruction, as intended by the application program, may be defined in terms of a degree of a progress of the application program. That is, a period used for a wasteful cycle in terms of indicating an actual progress of the application may be defined as a non-effective execution period, and instructions of a processor in the non-effective execution period may be defined as non-effective instructions. The non-effective execution period may correspond to a predetermined period in a processor cycle for executing an instruction in an actual processor, and may include an instruction set corresponding to a program source code block included in a predetermined area at a program code level. In response to being informed of an instruction, the controller 320 may determine whether an execution scheme corresponds to the effective execution scheme or the non-effective scheme based on a predetermined criterion, which will be described with reference to FIG. 5. Here, the predetermined criterion may be defined for each of the HWNE and the SWNE.

The EPC 330 may generate an EPI for an instruction executed, other than an instruction executed in the non-effective execution scheme, among instructions in the effective execution scheme.

The EPC 330 may generate an EPI by increasing a count when an instruction executed in a thread is executed in the effective execution scheme. The EPC 330 may generate the EPI by eliminating a case of being executed in the non-effective execution scheme from an RPI. The RPI may correspond to an indicator indicating a physical time for executing a thread.

In response to an execution scheme of an instruction being determined to be the non-effective execution scheme, the EPC 330 may perform a count based on a system clock.

The EPC 330 may be located in a processor unit. That is, a single EPC, for example, the EPC 330 may be included per processor.

An operation of the EPC 330 may be controlled by an HWNE signal or an SWNE signal. The EPC 330 may suspend a count in response to the HWNE signal or the SWNE signal being set, and may restart the count in response to the HWNE signal or the SWNE signal being cleared.

The HWNE signal may correspond to a signal that executes an instruction in the non-effective execution scheme at an instruction level of a processor based on hardware, and the SWNE signal may correspond to a signal that executes a function by the non-effective execution scheme at a function level including instructions based on software.

The HWNE signal may be generated based on a stall signal occurring in a processor. The SWNE signal may be generated using an application programming interface (API) when executing a user function including instructions.

Figure 4:
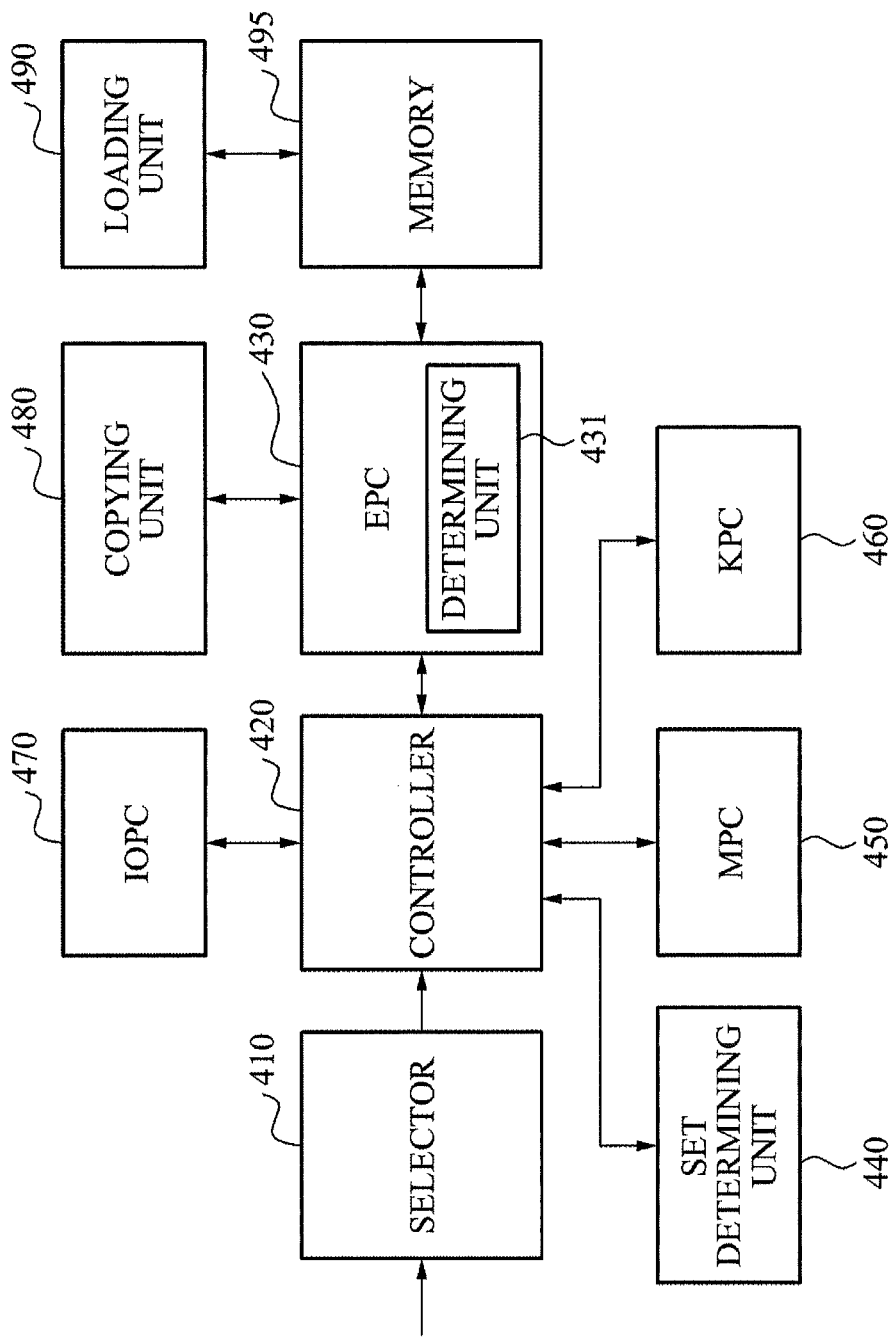
FIG. 4 illustrates another apparatus for thread progress tracking according to example embodiments.

FIG. 4 illustrates another apparatus for thread progress tracking according to example embodiments.

Referring to FIG. 4, an apparatus for thread progress tracking according to example embodiments includes a selector 410, a controller 420, an EPC 430, a set determining unit 440, a memory progress counter (MPC) 450, a kernel progress counter (KPC) 460, an input-output progress counter (IOPC) 470, a copying unit 480, a loading unit 490, and a memory 495.

The selector 410 may select at least one thread included in an application.

The controller 420 may determine whether an execution scheme for each instruction included in a thread corresponds to an effective execution scheme in which an execution time is uniform or a non-effective execution scheme in which a delayed cycle is included and the execution time is non-uniform.

The EPC 430 may generate an EPI for an instruction executed in the effective execution scheme other than an instruction executed in the non-effective execution scheme among instructions.

The EPC 430 may include a determining unit 431. The determining unit 431 may determine whether the EPC 430 operates by determining to set an SWNE signal when a thread is in a non-running state.

In response to an interrupt occurring in a thread in a running state, the determining unit 431 may suspend the EPC 430 by setting the SWNE signal. The determining unit 431 may clear the SWNE signal so that the EPC 430 may operate in response to the thread being in a running state after performing an interrupt service routine.

The set determining unit 440 may determine whether a flag value is set in a thread control block of a thread on a scheduler. The flag value may be set to indicate that a non-effective function is in use.

The set determining unit 440 may determine whether to execute the non-effective function through the flag value. The set determining unit 440 may suspend the EPC 430 by setting an SWNE signal when the flag value is set. The set determining unit 440 may correct an increment of the EPC 430 not used for executing code of a thread effectively when the flag value fails to be set.

The MPC 450 may generate a memory progress index (MPI). The MPC 450 may generate the MPI by accumulating a cycle expended to access a shared memory while a thread occupies a processor and the thread is executed. The MPI may correspond to an example in which a thread or an instruction is executed in the non-effective execution scheme. The MPI may refer to a cycle expended due to a collision occurring when accessing a shared memory in a non-effective scheme period while executing an application.

The KPC 460 may generate a kernel progress index (KPI). The KPC 460 may generate the KPI by accumulating a cycle expended to operate a system kernel while a thread occupies a processor and the thread is executed. The KPI may correspond to an example in which a thread or an instruction is executed in the non-effective execution scheme. An example of executing a system kernel may include system functions such as an interrupt, a thread context switch, a malloc, and the like. A collision may occur when accessing a kernel shared resource due to the system functions being called and thus, a non-effective execution period may occur.

The IOPC 470 may generate an input-output progress index (IOPI). The IOPC 470 may generate the IOPI by accumulating a cycle used for repeatedly verifying input and output states to execute input-output code of input/output (I/O) data while a thread occupies a processor and the thread is executed. The IOPI may correspond to an example in which a thread or an instruction is executed in the non-effective execution scheme. The IOPI may be generated through the KPC 460.

The IOPC 470 may not operate for a data exchange through an actual I/O in an access form of a polling scheme for an I/O access. That is, the IOPC 470 may operate when a processor performs a code execution of repeatedly checking I/O states.

For example, the apparatus for thread progress tracking may detect various performance indicators capable of measuring a state of an application program. A performance indicator may include an RPI, the EPI, the MPI, the KPI, and the IOPI.

The RPI may refer to an accumulated value of a processor cycle accumulated while the thread is executed in a processor. The RPI may be used as an indicator that indicates processor share of the thread.

The EPI may refer to an accumulated value of an effective execution cycle counted at a processor cycle level of the thread. The EPI may be used as an indicator that indicates an effective progress of the thread.

The MPI may refer to an accumulated value stalled or expended due to a shared resource access and collision while executing the thread. The MPI may be used as an indicator that indicates access to a shared resource and a degree of a collision occurring.

The KPI may refer to an accumulated value of a non-effective cycle occurring due to a system kernel execution while executing the thread. The KPI may be used as an indicator that indicates access to a shared resource and a degree of a collision occurring.

The IOPI may refer to a cycle used for repeatedly verifying I/O states so as to execute I/O code while executing the thread. The IOPI may be used as an indicator that indicates access to an I/O resource and a degree of a collision occurring.

The apparatus for thread progress tracking may analyze a state of threads included in an application program using the indicators described in the foregoing. For example, the apparatus for thread progress tracking may verify an actual progress of a program in comparison with processor share of the application program using a difference between the EPI and the RPI. In this instance, the difference between the EPI and the RPI may be defined as a non-effective cycle Td of the thread.

The apparatus for thread progress tracking may calculate thread efficiency (TE) using the non-effective cycle Td and the RPI. In this instance, the TE may be defined by the following equation.

$$TE=1-(Td/RPI)$$

The TE may be used as an indicator that indicates energy efficiency of the thread.

The apparatus for thread progress tracking may calculate thread shared memory efficiency (ME) using the non-effective cycle Td and the MPI. In this instance, the ME may be defined by the following equation.

$$ME=1-(MPI/Td)$$

The ME may be used as an indicator that indicates a ratio of a period used effectively, without a collision in a shared resource.

The apparatus for thread progress tracking may calculate I/O efficiency (IOE) of the thread using the non-effective cycle Td and the IOPI. In this instance, the IOE may be defined by the following equation.

$$IOE=1-(IOPI/Td)$$

The IOE may be used as an indicator that indicates a ratio of a period used effectively, without a collision in an I/O shared resource.

The apparatus for thread progress tracking may calculate kernel efficiency (KE) using the non-effective cycle Td and the KPI. In this instance, the KE may be defined by the following equation.

$$KE=1-(KPI/Td)$$

The KE may be used as an indicator that indicates a ratio of a period used effectively, without a collision in a kernel shared resource.

The apparatus for thread progress tracking may the MPI, the KPI, and the IOPI in response to the non-effective cycle Td being greater than a predetermined reference value. The apparatus for thread progress tracking may divide an allocation of a shared resource, or may allocate data to a divided memory region in response to the MPI being greater than a predetermined reference value. In response to the KPI being greater than a predetermined reference value, the apparatus for thread progress tracking may prevent a collision from occurring between kernel resources by applying a separately divided system partition in a case of a dynamic partition being applied to a system kernel.

The copying unit 480 may copy a current value of the EPC 430 in the memory 495 while the thread is in a running state. The memory 495 may store the EPI corresponding to a thread for each thread.

The copying unit 480 may copy a value of the EPC 430 to be the EPI in the memory 495 at a point in time at which a first thread context-switches to a second thread. The loading unit 490 may load the EPI copied in the memory 495 to the EPC 430 in response to the second thread context-switching back to the first thread.

Figure 5:
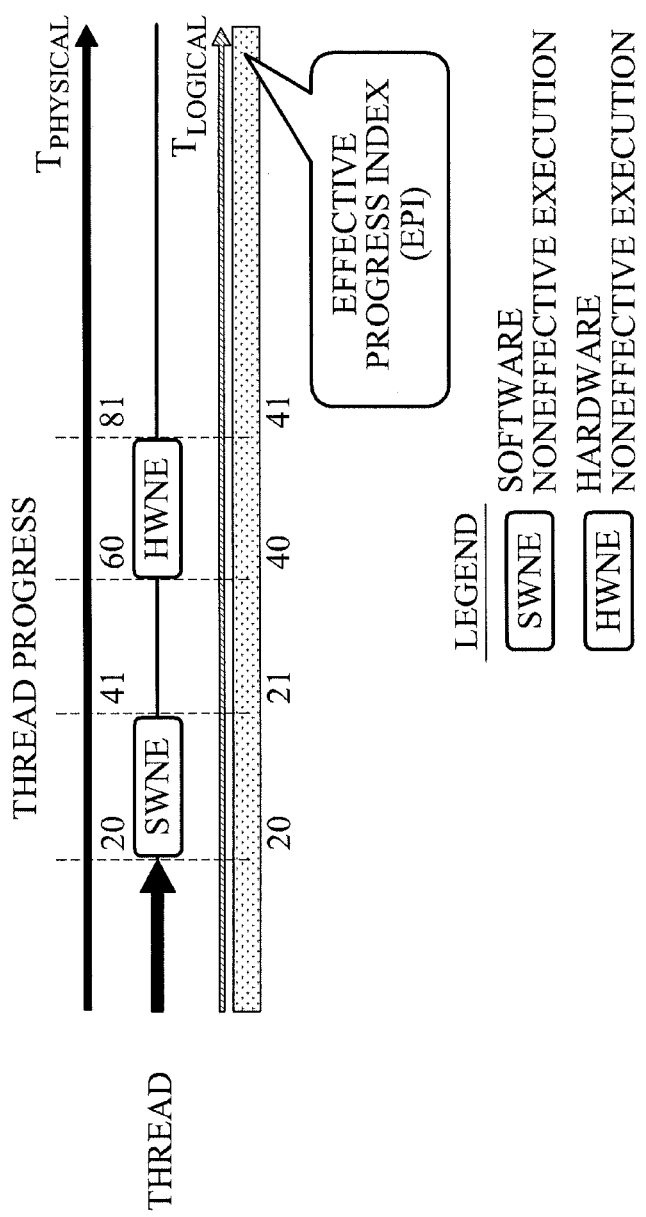
FIG. 5 illustrates a concept of an effective progress index (EPI) according to example embodiments.

FIG. 5 illustrates a concept of an EPI according to example embodiments. In particular, FIG. 5 illustrates a concept of an EPI excluding an HWNE and an SWNE from a progress of a thread.

FIG. 5 illustrates a concept of an EPI expressing, by an indicator, a logical time excluding the SWNE and the HWNE from an execution period of an actual thread. While the SWNE and the HWNE are executed, a physical time may increase, and the EPI may not increase. Thus, the EPI may be used as an indicator that indicates an absolute progress location of a thread.

In executing the thread, the SWNE and the HWNE may be determined by a predetermined criterion. The predetermined criterion may be defined based on a case in which an execution time, measured until a present time, of an instruction or a function including instructions is uniform and a case in which the execution time is non-uniform. The predetermined criterion may correspond to an example of the SWNE and the HWNE to be defined, and may not be limited thereto. The predetermined criterion may include a predetermined range.

An example of the SWNE and the HWNE is classified in Table 1.

TABLE 1

| | Type | Example |
|---|---|---|
| SWNE | schedule time | all thread state excluding running state |
| | | wait for event or timer (EventWait( ), sleep( ), . . .) |
| | management of interrupt | interrupt management instruction interrupt service routine |
| | allocation of dynamic resource | memory allocation/non-allocation thread generation/termination |
| | non-effective user function | busy waiting |
| | non-effective external device access | blocked access for hardware device |
| | others | |
| HWNE | external memory access | DRAM access |
| | cache miss | instruction/data cache miss |
| | branch | dynamic branch prediction |
| | others | |

In Table 1, the busy waiting may not correspond to the SWNE in a case of a data exchange through an actual I/O in an access form of a polling scheme for an I/O access. The busy waiting may correspond to the SWNE when repeatedly executing code in order to check I/O states. The SWNE and the HWNE may include any execution period non-effective for performing a function of a thread in addition to a case illustrated in Table 1.

Figure 6:
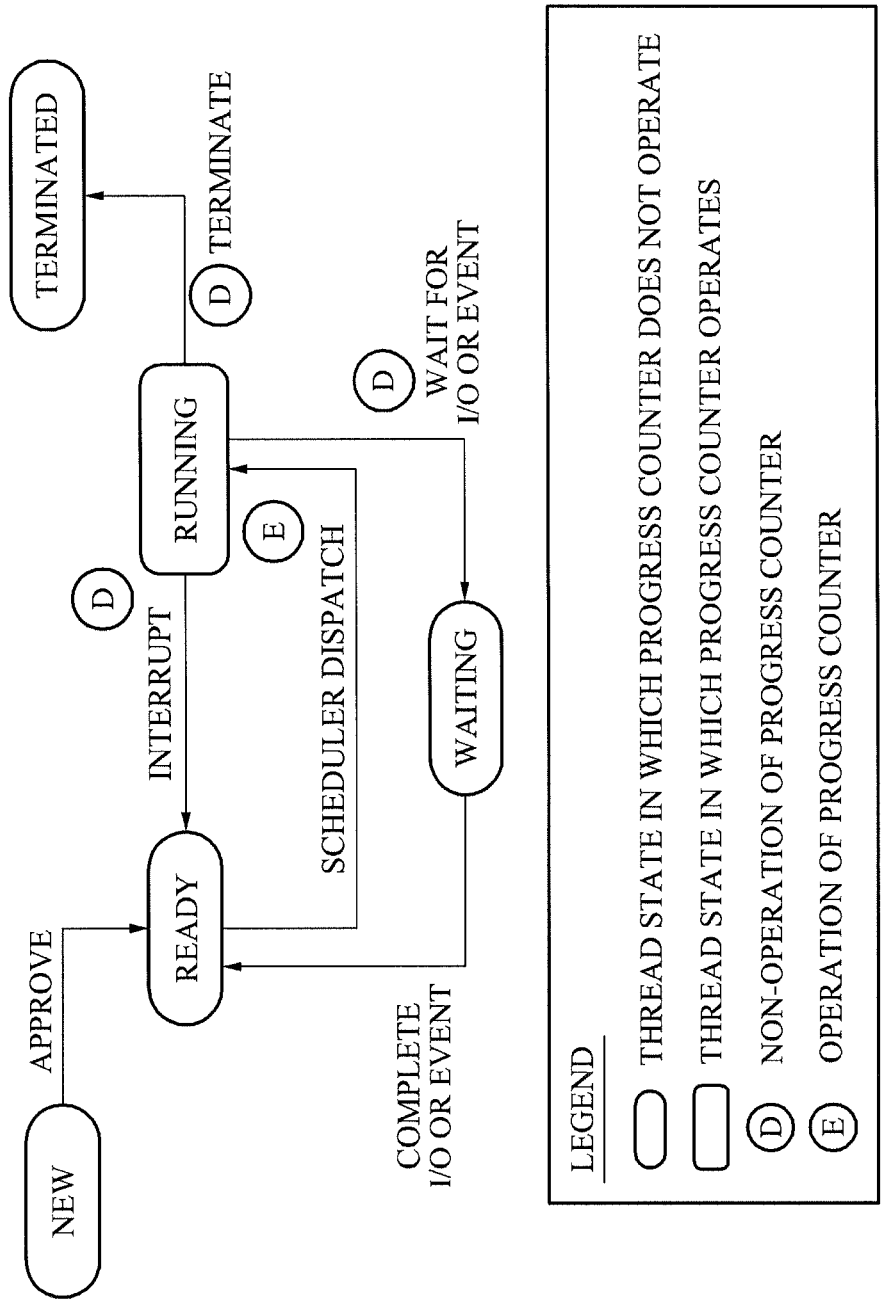
FIG. 6 illustrates whether a progress counter operates based on a change of a state of a thread according to example embodiments.

FIG. 6 illustrates whether a progress counter operates based on a change of a state of a thread according to example embodiments.

An operating system may manage and schedule resources so that a system resource may be efficiently used through several threads included in an application. In response to a thread being scheduled by the operating system, a state transition may occur as illustrated in FIG. 6.

The thread may actually be executed when the thread is in a running state. Thus, an apparatus for thread progress tracking may control an SWNE signal to prevent an EPC from operating when the thread is in a non-running state.

For example, the apparatus for thread progress tracking may prevent the EPC from operating by setting the SWNE signal in response to an interrupt occurring while the thread is running. The apparatus for thread progress tracking may clear the SWNE signal so that the EPC may operate in response to the thread being scheduler-dispatched and being in a running state after performing an interrupt service routine. That is, the apparatus for thread progress tracking may generate an index when an EPI of the corresponding thread is executed effectively.

Figure 7:
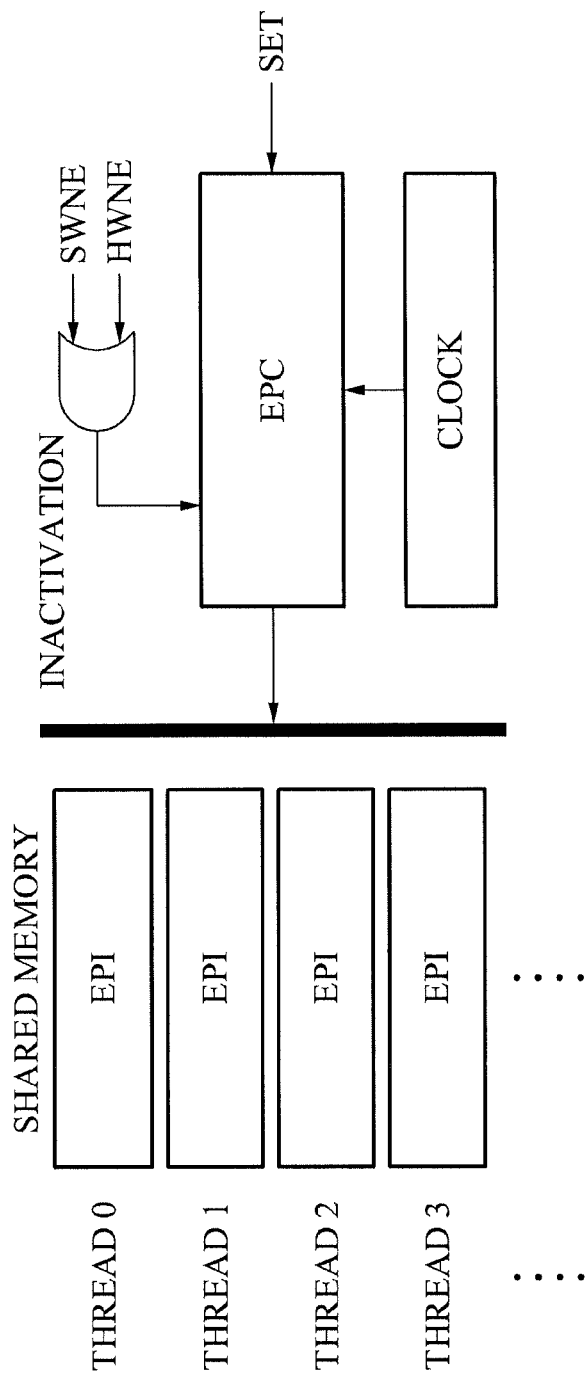
FIG. 7 illustrates a relationship between an effective progress counter (EPC) and an EPI for each thread according to example embodiments.

FIG. 7 illustrates a relationship between an EPC and an EPI for each thread according to example embodiments.

Referring to FIG. 7, an EPC may be located for each processor, and an activation of the EPC may be determined based on an SWNE signal and an HWNE signal.

FIG. 7 illustrates an OR logic circuit, and a counter configured to be inactivated when the SWNE signal or the HWNE signal is set. Here, whether the counter is activated may depend on whether the EPC is operated. Various schemes other than the OR logic circuit also may be used as a scheme of controlling the counter based on the SWNE signal and the HWNE signal.

An apparatus for thread progress tracking may have a shared memory space capable of storing each EPI for each thread, and may copy a current value of the EPC in an EPI memory. The apparatus for thread progress tracking may copy a value counted through the EPC in the EPI memory.

In this instance, the apparatus for thread progress tracking may periodically copy a value of the EPC in the EPI memory. However, continuously copying the value of the EPC in the EPI memory may entail a decrease in a runtime performance and thus, an EPI of a thread being executed may be indicated by the EPC.

The value of the EPC may be copied in the EPI memory at a point in time at which a first thread in use context-switches to a second thread. In response to the second thread being dispatched and being transited to a running state, the apparatus for thread progress tracking may set the EPI stored in the EPI memory of the second thread to the EPC so that the EPC may be counted from the EPI corresponding to a previous execution indicator.

In response to being context-switched to the first thread before the context-switch, the apparatus for thread progress tracking may load the EPI stored in the EPI memory allocated to the first thread to set the EPI to an initial value of the EPC.

The EPC may perform a count based on a system clock, and may cause a count value to increase in an effective execution by controlling an operation of the EPC based on the SWNE signal or the HWNE signal.

Figure 8A:
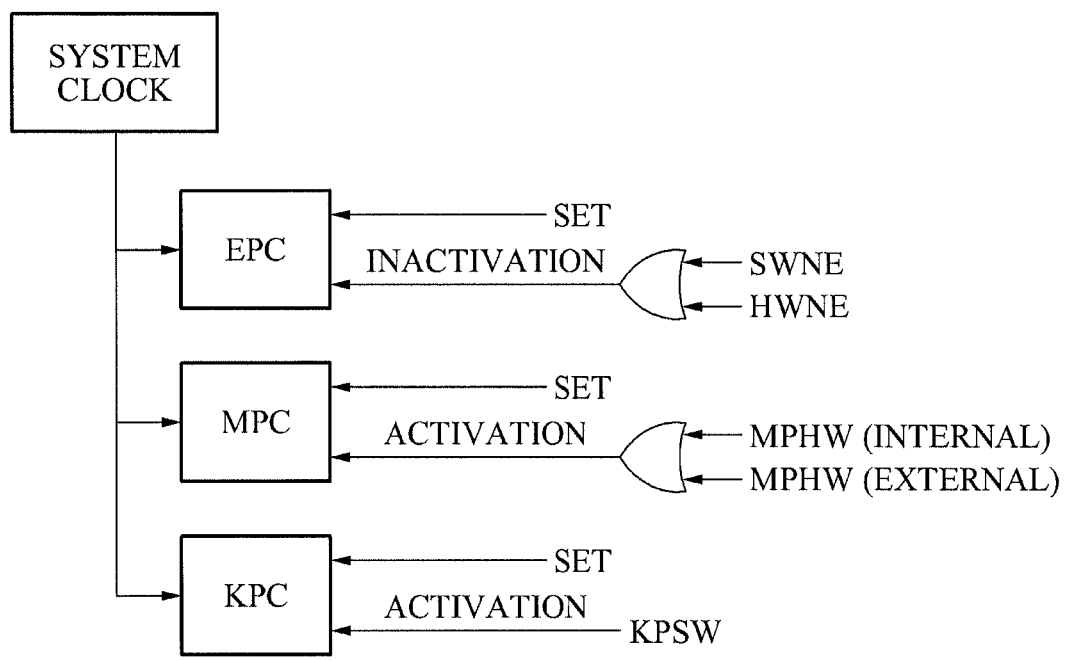
FIG. 8A illustrates an EPC, a memory progress counter (MPC), and a kernel progress counter (KPC) according to example embodiments.

FIG. 8A illustrates an EPC, an MPC, and a KPC according to example embodiments.

An EPC, an MPC, and a KPC may perform a count according to a system clock. An RPI may be generated by the system clock.

In response to an SWNE signal or an HWNE signal being set, the EPC may be inactivated to terminate a count operation. After the SWNE signal or the HWNE signal is cleared, the EPC may restart the count operation.

In response to a memory progress hardware (MPHW) (internal) signal or a memory progress hardware (MPHW) (external) signal being set, the MPC may be activated and start the count operation. The MPHW (internal) signal may occur depending on a circumstance of an internal data in a hardware core stall. The MPHW (external) signal may occur according to a stall generated by an external memory load/store. After the MPHW (internal) signal or the MPHW (external) signal is cleared, the MPC may terminate the count operation.

In response to a kernel progress software (KPSW) signal being set, the KPC may be activated to start the count operation. The KPSW signal may occur according to a call of a system function using a system kernel. After the KPSW signal is cleared, the KPC may terminate the count operation.

Figure 8B:
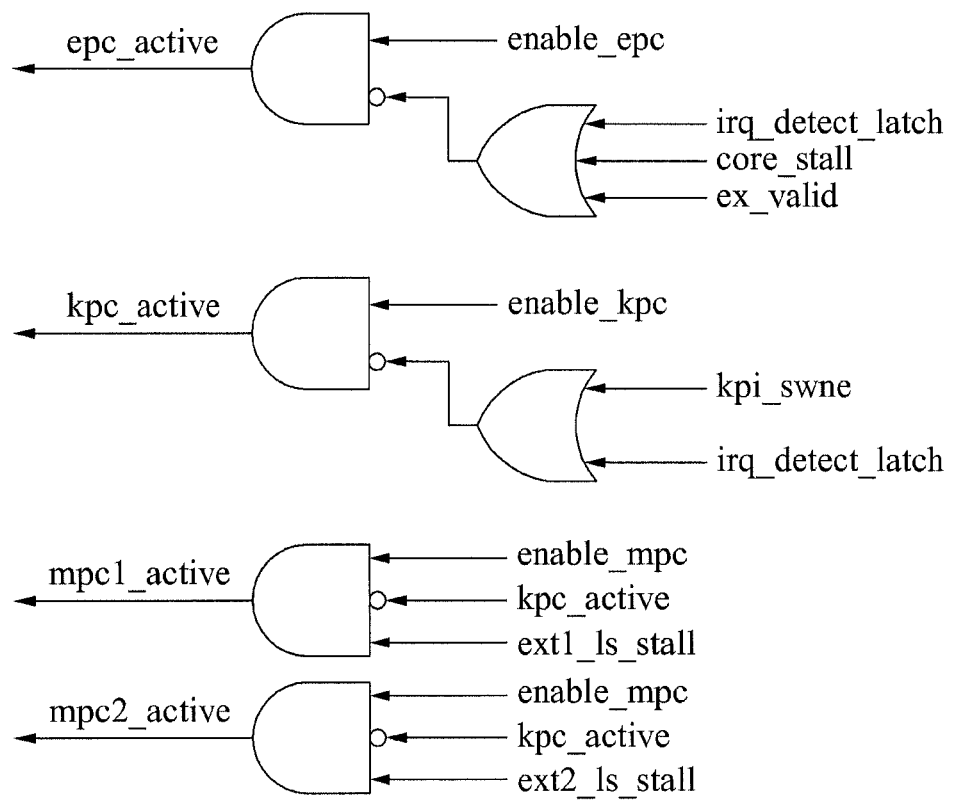
FIG. 8B illustrates signals that activate an EPC, an MPC, and a KPC according to example embodiments.

FIG. 8B illustrates signals that activate an EPC, an MPC, and a KPC according to example embodiments.

An activation signal and an inactivation signal of the EPC, an activation signal of the KPC, an internal/external activation signal of the MPC may be generated using singles of a core. An enable_epc signal, an enable_kpc signal, and an enable_mpc signal of a control logic may be controlled by software. The enable_epc signal may activate an operation of the EPC. The enable_kpc signal may activate an operation of the KPC. The enable_mpc signal may activate an operation of the MPC.

For example, the inactivation signal of the EPC may include an irq_detect_latch signal, a core_stall signal, and an ex_valid signal.

An apparatus for thread progress tracking may generate, using a latch logic, the irq_detect_latch signal from an irq_detect signal corresponding to an interrupt detect signal in a core to control an interrupt operation occurring frequently.

The irq_detect_latch signal may be maintained for a cycle during which the core processes an interrupt request (irq) in response to the irq being detected.

An interrupt handler module of an operating system may clear the irq_detect_latch signal in response to an interrupt period being terminated.

A scheme using the irq_detect_latch signal may greatly suppress deterioration of a performance used for controlling the EPC by controlling the interrupt period of the EPC by software.

The ex_valid signal may indicate that an instruction of a pipeline to be executed after being filled with an interrupt and a branch is non-effective. In this instance, a cycle for executing the instruction of the pipeline may correspond to an execution actually invalid, and may correspond to a core cycle to be eliminated from the EPC. The core_stall signal may indicate various cases of being stalled in a core level. For example, an occurrence of a stall of a core such as a case of being stalled to load data by a cache-miss, or a case in which a stall occurs due to a data dependency of an internal register, and the like may be included.

The activation signal of the KPC may include a kpi_swne signal and an irq_detect_latch signal controlled by software.

The MPC may not operate when the KPC is inactivated. That is, the activation signal of the KPC may correspond to an inactivation signal of the MPC.

An external memory load/store stall signal may be used as an activation signal of the MPC. When an internal memory load/store stall (ext1_ls_stall) signal and an external memory load/store stall (ext2_ls_stall) are separately generated in a core, two MPCs may operate according to two separated two signals.

The apparatus for thread progress tracking may operate two counters of an MPC1 and an MPC2 to separately measure a collision rate due to access to an external and internal memory.

Figure 9:
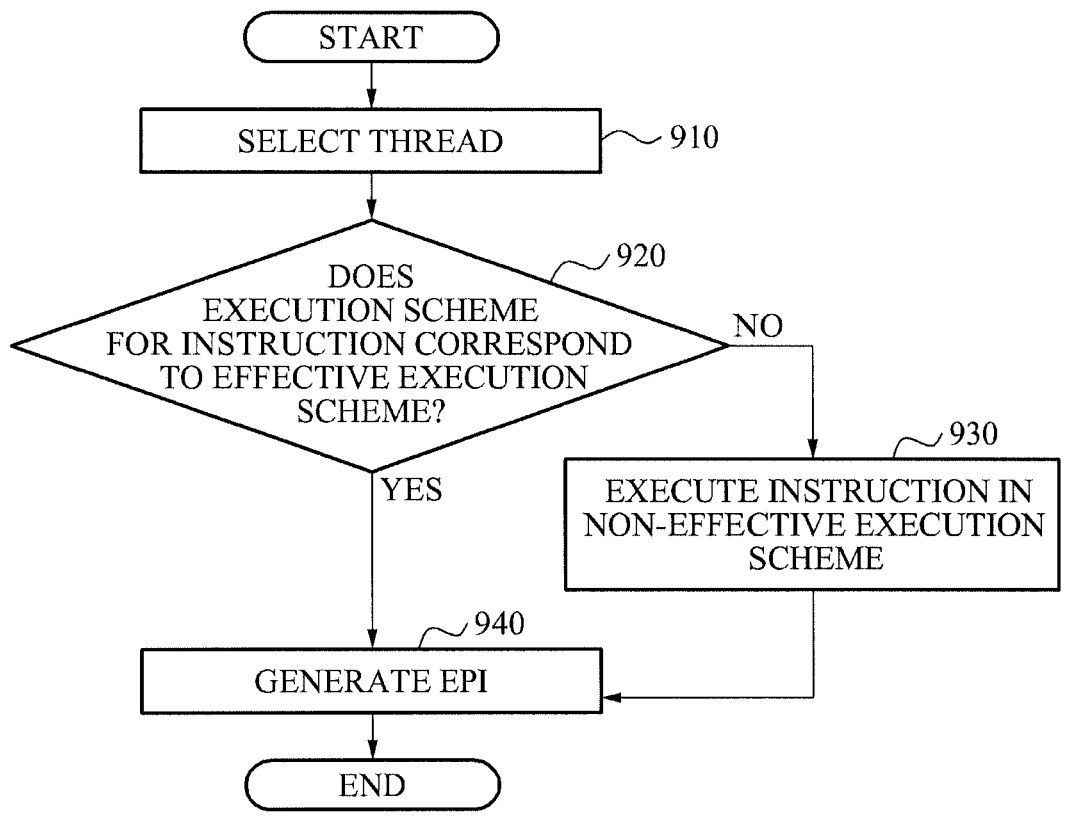
FIG. 9 illustrates a method for thread progress tracking according to example embodiments.

FIG. 9 illustrates a method for thread progress tracking according to example embodiments.

In operation 910, an apparatus for thread progress tracking selects at least one thread included in an application program. The apparatus for thread progress tracking may select a thread that executes an application program desired by a user.

In operation 920, the apparatus for thread progress tracking determines whether an execution scheme for each instruction included in the thread corresponds to an effective execution scheme in which an execution time is uniform or a non-effective execution scheme in which a delayed cycle is included and the execution time is non-uniform.

In operation 930, in response to the execution scheme being the non-effective execution scheme, the apparatus for thread progress tracking executes an instruction in the non-effective execution scheme without operating an EPC.

In operation 940, for an instruction executed in the effective execution scheme among at least one instruction, the apparatus for thread progress tracking generates an EPI based on the EPC. Here, operation of the EPC may be controlled by an HWNE signal that executes an instruction via the non-effective execution scheme at an instruction level of a processor based on hardware, or an SWNE signal that executes a function via the non-effective execution scheme at a function level including instructions based on software.

Figure 10:
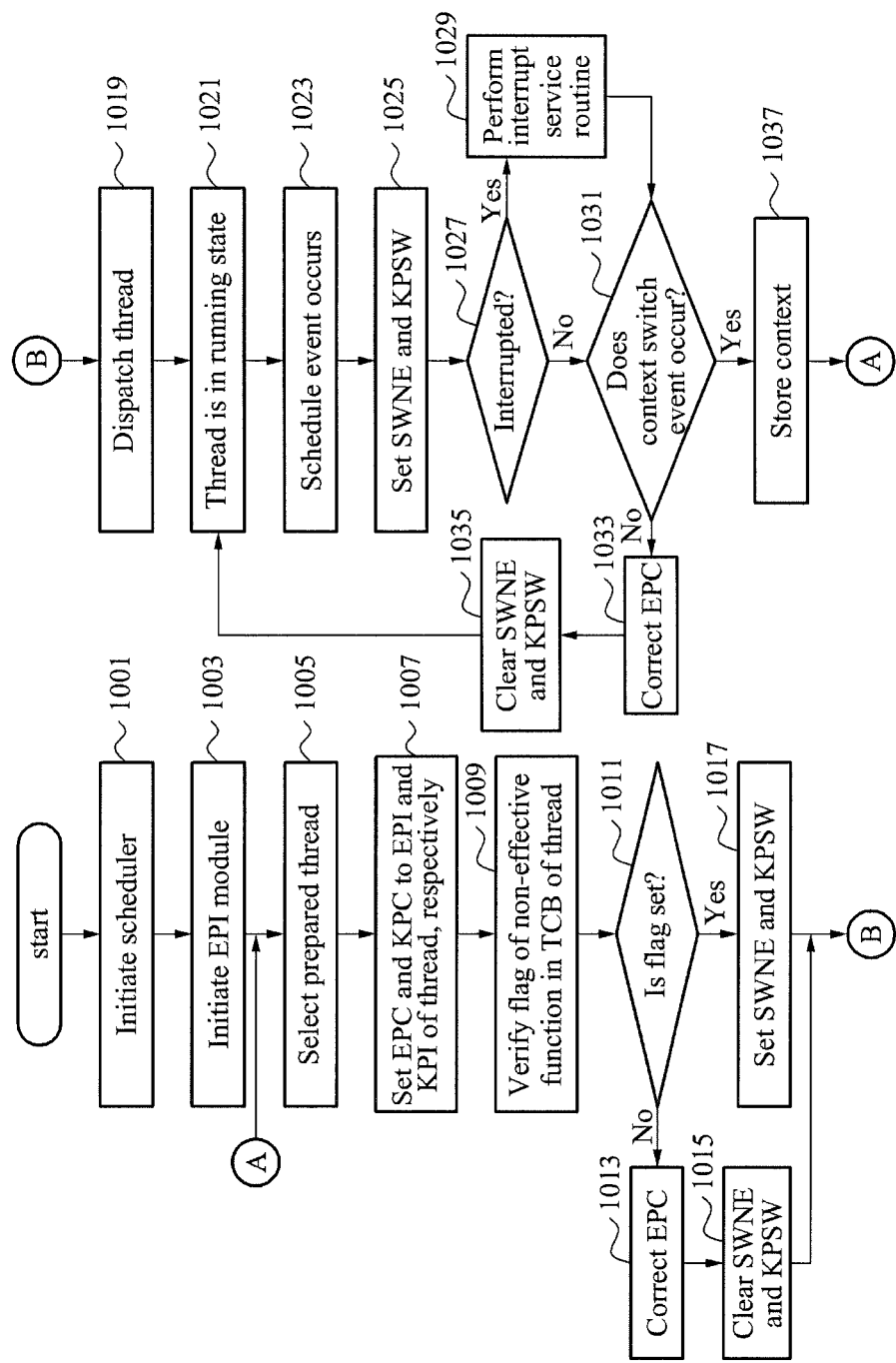
FIG. 10 illustrates a non-effective function being executed in a scheduler operation of an operating system in a method for thread progress tracking according to example embodiments.

FIG. 10 illustrates that a non-effective function is executed in a scheduler operation of an operating system in a method for thread progress tracking according to example embodiments.

An SWNE signal may occur when a non-effective function is executed in a running state of a thread. For example, when a dynamic memory allocation system function such as a "malloc" is called to the thread, an execution time of the "malloc" may be non-uniform. An apparatus for thread progress tracking may classify, as an SWNE execution period, a period from calling a "malloc" function until receiving a result so as to prevent an EPC from operating in the SWNE execution period. A function such as the "malloc" function having a non-uniform execution time may be referred to as a non-effective function.

In operation 1001, an apparatus for thread progress tracking initiates a scheduler of an operating system.

In operation 1003, the apparatus for thread progress tracking initiates an EPC module. An initiation is performed to distinguish a procedure to be performed and a procedure performed before.

In operation 1005, the apparatus for thread progress tracking selects a thread prepared according to an instruction to be executed on the scheduler. The instruction to be executed may vary depending on a thread and thus, a thread may be selected according to an execution instruction set on the scheduler.

In operation 1007, the apparatus for thread progress tracking sets an EPI stored in the thread to an initial value of the EPC. The apparatus for thread progress tracking sets a KPI stored in the thread to an initial value of a KPC. When a value of the EPC first starts from a count in the thread, the value may start from "0." However, when the thread is switched from another thread due to a context-switch, the EPI stored in an EPI memory may be set to an initial value to start a count.

In operation 1009, the apparatus for thread progress tracking verifies whether a flag is included to indicate that a non-effective function is in use in a thread control block of the thread.

In operation 1011, the apparatus for thread progress tracking determines whether a flag value is set in the thread control block.

In operation 1013, when a flag value of the thread control block fails to be set, the apparatus for thread progress tracking corrects an increment of an EPC not used for executing code of the thread effectively.

In operation 1015, the apparatus for thread progress tracking clears an SWNE signal to operate a suspended EPC. An EPC cycle using a correction for each period may be defined in advance. Here, the apparatus for thread progress tracking may correct the EPC according to a defined value.

The EPC cycle to be corrected may include a cycle used for a formal operation such as setting, clearing, and inactivating. For example, when an execution time used for setting an SWNE corresponds to four cycles, the four cycles may not be used for executing an instruction in the thread effectively and thus, a correction of subtracting the four cycles from an EPC value may be performed before clearing the SWNE. Similarly, the EPC value may be corrected when calling the non-effective function.

The apparatus for thread progress tracking may suspend the KPC by clearing a KPSW signal.

In operation 1017, when the flag value of the thread control block is set, the apparatus for thread progress tracking suspends the EPC by setting an SWNE signal. The apparatus for thread progress tracking operates the KPC by setting the KPSW signal. Thereafter, operations from B may follow.

In operation 1019, the apparatus for thread progress tracking dispatches the thread.

In operation 1021, the dispatched thread is in a running state. The EPC may operate after the SWNE is cleared and thus, an instruction to be used for the thread may continue to be executed.

In operation 1023, a schedule event may occur in the thread in the running state.

In operation 1025, the apparatus for thread progress tracking suspends the EPC by setting the SWNE signal. An interrupt may be provided as a general example of the schedule event, and may include waiting for an I/O and calling a nondeterministic function. The apparatus for thread progress tracking may operate the KPC by setting the KPSW signal.

In operation 1027, the apparatus for thread progress tracking determines whether an interrupt occurs as an example of the schedule event.

In operation 1029, in response to the schedule event occurring, the apparatus for thread progress tracking performs an interrupt service routine. In this instance, the apparatus for thread progress tracking may suspend a count operation of the EPC by setting the SWNE signal.

In operation 1031, the apparatus for thread progress tracking determines whether a context switch event occurs in a state in which the EPC is suspended.

In operation 1037, in response to the context switch event occurring, the apparatus for thread progress tracking stores a value of the suspended EPC to be the EPI of the thread before being switched. The apparatus for thread progress tracking may store a result of a context executed until a point in time at which a context switch occurs.

In operation 1033, in response to the schedule event being terminated in a state in which the EPC is suspended, the apparatus for thread progress tracking corrects an increment of the EPC not used for effectively executing code of the thread.

In operation 1035, the apparatus for thread progress tracking operates the suspended EPC by clearing the SWNE signal. Further, the apparatus for thread progress tracking suspends the KPC by clearing the KPSW signal.

The apparatus for thread progress tracking may repeat operations from A by selecting a thread prepared after a context is switched.

Figure 11:
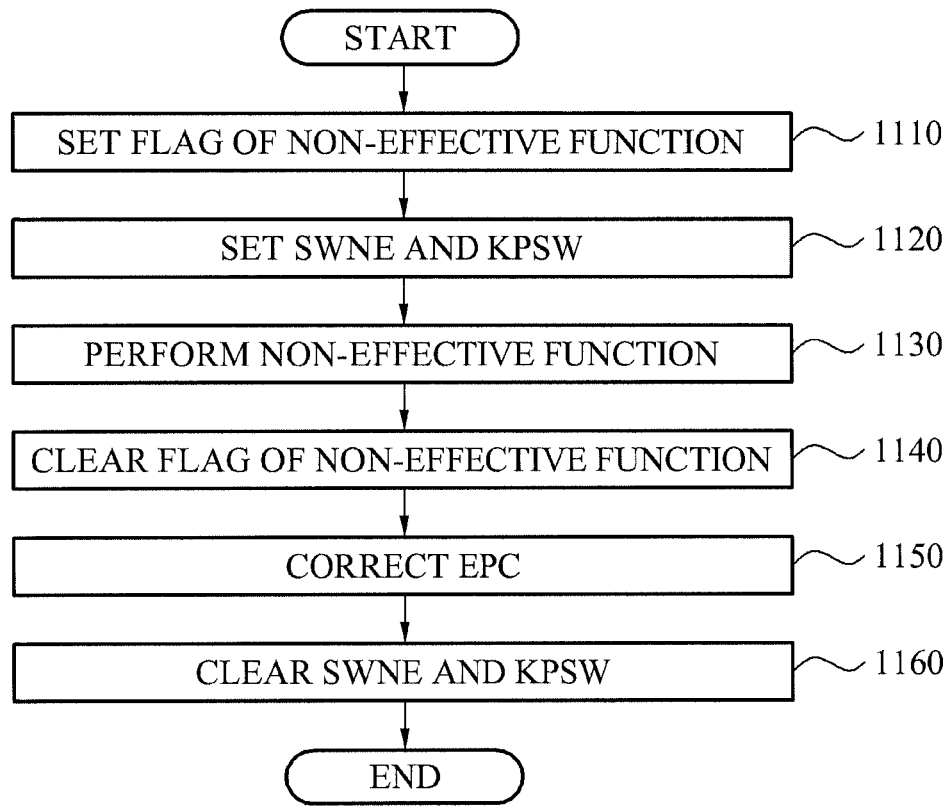
FIG. 11 illustrates an operation of an EPC when a non-effective function is in use in a method for thread progress tracking according to example embodiments.

FIG. 11 illustrates an operation of an EPC when a non-effective function is in use in a method for thread progress tracking according to example embodiments. In particular, FIG. 11 illustrates an operation of the EPC when a user function is used in an operation of executing a general application program.

In operation 1110, an apparatus for thread progress tracking determines whether a flag value set to indicate that a user function in use is set in a thread control block of a thread. Here, the user function may correspond to an example of a non-effective function.

The user function corresponding to one of several cases capable of generating an SWNE signal may generate the SWNE signal by providing a separate API. A case of repeatedly performing a predetermined function during "busy waiting" may be provided as a representative case.

For example, in a case of a function to which data is added when an input queue of an external device is verified to be empty, a delay time for verification may increase depending on a state of the external device. Thus, the apparatus for thread progress tracking may prevent the EPC from operating by providing the separate API.

Another example may correspond to pseudo code indicating an execution scheme for a user busy waiting function. Further, a "SWNESet( )" and "SWNEClear( )" API may be provided to allow a user to define a code region that is actually ineffective according to a characteristic of an application program to be set to an SWNE execution period.

```
NonEffectiveBusyWait(void (*function)(void*), void *Args) {
    SetNEFunctionFlag( );
    EFCDisable( );
    function(Args); /* process non-effecitve user function
    ClearNEFunctionFlag( );
    EFCEnable( );
}
```

```
SWNESet(void) {
    SetNEFunctionFlag( );
    EFCDisable( );
}
    SWNEClear(void) {
        ClearNEFunctionFlag( );
        EFCEnable( );
    }
```

Still another example may correspond to program code that starts a data transmission according to a state of "io" acquired from "io_status_check( )".

```
retry:
    if (io_status_check( ) == OK)
    {
        start_io_data_transfer( );
    }else goto retry;
```

When an io_status_check function is initially executed, and a result of the execution corresponds to OK, a cycle executed thereafter may be included in the EPI. When the result of the execution fails to correspond to OK, a cycle executed thereafter may be excluded from the EPI, and an IOPI may be increased to be used as a non-effective cycle indicator occurring due to an IO collision.

After being verified to be in an OK state, in a repetitive io_status_check, an IOPI cycle may be cease to increase, and the EPI may increase. A separate IOPC may be used by hardware to measure the IOPI cycle, and a KPI may be used to measure the IOPI cycle.

In operation 1120, in response to the flag value being set, the apparatus for thread progress tracking sets the SWNE signal to suspend the EPC. Further, the apparatus for thread progress tracking sets a KPSW signal to operate the KPC.

In operation 1130, the apparatus for thread progress tracking executes a user function. In this instance, the user function may correspond to an example of the non-effective function.

In operation 1140, in response to an execution of the user function being terminated, the apparatus for thread progress tracking clears the set flag value.

In operation 1150, the apparatus for thread progress tracking corrects an increment of the EPC not used for executing code of an actual thread effectively.

In operation 1160, the apparatus for thread progress tracking clears the SWNE signal to operate the suspended EPC. That is, the apparatus for thread progress tracking clears the KPSW signal to suspend the KPC.

Figure 12:
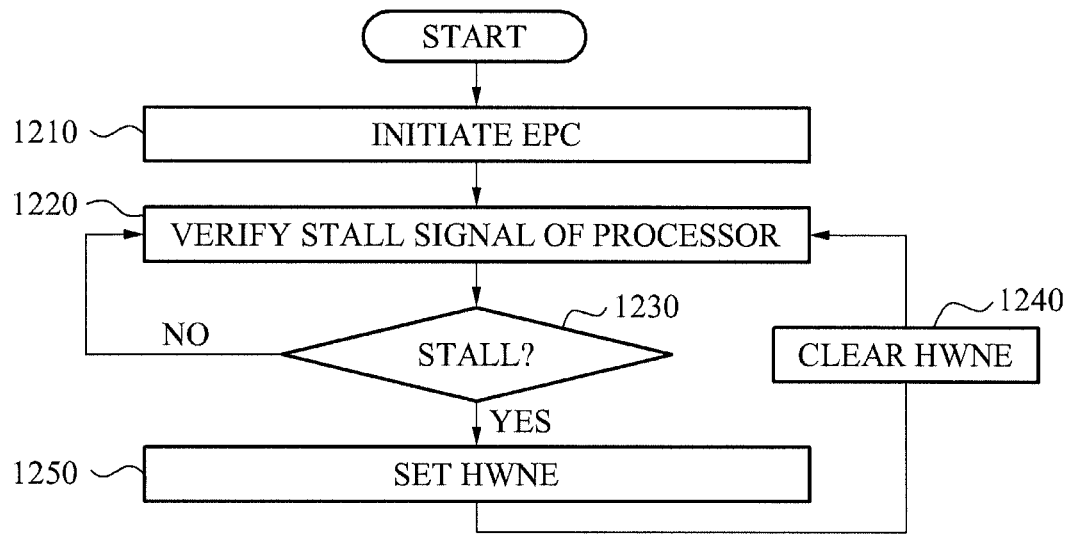
FIG. 12 illustrates an operation of generating a hardware non-effective execution (HWNE) signal according to example embodiments.

FIG. 12 illustrates an operation of generating an HWNE signal according to example embodiments.

In operation 1210, an apparatus for thread progress tracking initiates an EPC. Here, the initiating may indicate that an instruction execution operation being started is blocked from an existing instruction execution operation.

In operation 1220, the apparatus for thread progress tracking verifies a stall signal of a processor. When a state or a signal of the processor capable of indicating a non-effective execution period of the processor is present other than the stall signal, the apparatus for thread progress tracking uses the state or the signal of the processor as a signal for controlling the EPC to prevent the EPC from increasing in the non-effective execution period.

The apparatus for thread progress tracking verifies whether the stall signal is detected in operation 1230, and suspends an operation of the EPC by setting an HWNE signal in response to the stall signal being detected in operation 1250.

In operation 1240, in response to the stall signal not being detected, the apparatus for thread progress tracking clears the HWNE signal to restart an operation of the EPC when the operation is suspended. When the operation of the EPC is not suspended, the apparatus for thread progress tracking may continue operating the EPC.

A bit width of the EPC may be determined based on a cycle of a processor. A relatively small bit width of the EPC may frequently cause an overflow and thus, update intervals may be relatively small. Thus, when the bit width of the EPC is set to be greater than or equal to 64 bits, a counter overflow may be prevented from occurring, which may minimize deterioration in performance due to a counter update. When a system operation clock is less than or equal to 50 megahertz (MHz), the bit width of the EPC may be decreased in proportion to the clock, thereby minimizing a cost of an implementation.

The method for thread progress tracking according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for thread progress tracking, the apparatus comprising:
a processor comprising:
a selector configured to select a thread included in an application program, wherein the thread includes a plurality of instructions;
a controller configured to determine, based on a predetermined criterion, an execution scheme for each instruction in the thread, wherein the execution scheme for each instruction on the thread is one of: an effective execution scheme and a non-effective execution scheme, wherein the effective execution scheme has an execution time that is uniform, and wherein the non-effective execution scheme has a delayed cycle included and has an execution time that is non-uniform;
an effective progress counter (EPC) configured to generate an effective progress index (EPI) by accumulating an execution time of each instruction determined to have an effective execution scheme, and by not accumulating an execution time of each instruction determined to have a non-effective execution scheme; and
a kernel progress count (KPC) configured to generate a kernel progress index (KPI) by accumulating a cycle expended to operate a system kernel while the thread occupies a processor and the thread is executed, and by not accumulating an execution time of each instruction determined to have an effective execution scheme.

2. The apparatus of claim 1, wherein the non-effective execution scheme includes at least one of:
a hardware non-effective execution (HWNE) scheme that executes an instruction by the non-effective execution scheme at an instruction level of a processor based on hardware; and
a software non-effective execution (SWNE) scheme that executes a function by the non-effective execution scheme at a function level including instructions based on software.

3. The apparatus of claim 1, further comprising:
a memory progress counter (MPC) to generate a memory progress index (MPI) by accumulating a cycle expended to access a shared memory while the thread occupies a processor and the thread is executed.

4. The apparatus of claim 1, further comprising:
an input-output progress counter (IOPC) to generate an input-output progress index (IOPI) by accumulating a cycle used for repeatedly verifying input and output states to execute an input-output code of input/output (I/O) data while the thread occupies a processor and the thread is executed.

5. The apparatus of claim 1, wherein the EPC performs a count based on a system clock in response to the execution scheme being determined to be the effective execution scheme.

6. The apparatus of claim 1, wherein an operation of the EPC is controlled by a Hardware non-execution (HWNE) signal that executes an instruction via the non-effective execution scheme at an instruction level of a processor based on hardware, or a Software non-execution (SWNE) signal that executes a function via the non-effective execution scheme at a function level including instructions based on software.

7. The apparatus of claim 6, wherein the HWNE signal is generated based on a stall signal occurring in a processor.

8. The apparatus of claim 6, wherein the SWNE signal is generated using an application programming interface (API) when executing a user function including instructions.

9. The apparatus of claim 1, wherein the EPC comprises a determining unit to determine to set an SWNE signal so as to prevent the EPC from operating when the thread is in a non-running state.

10. The apparatus of claim 9, wherein the determining unit sets the SWNE signal to prevent the EPC from operating in response to an interrupt occurring in the thread that is in a running state, and clears the SWNE signal so that the EPC operates in response to the thread being in a running state after performing an interrupt service routine.

11. The apparatus of claim 1, wherein the EPC is located in a processor unit.

12. The apparatus of claim 1, further comprising:
a memory to store an EPI corresponding to a thread for each thread; and
a copying unit to copy a current value of the EPC to be the EPI in the memory when the thread is in a running state.

13. The apparatus of claim 1, further comprising:
a copying unit to copy a value of the EPC to be the EPI in a memory at a point in time at which a first thread context-switches to a second thread; and
a loading unit to load the EPI copied in the memory to the EPC in response to the second thread context-switching back to the first thread.

14. The apparatus of claim 1, further comprising:
a set determining unit to determine whether a flag value set to indicate that a non-effective function is in use is set in a thread control block of the thread on a scheduler.

15. The apparatus of claim 14, wherein the set determining unit suspends the EPC by setting an SWNE signal when the flag value is set, and corrects an increment of an EPC not used for effectively executing code of a thread when the flag value fails to be set.

16. A method for thread progress tracking, the method comprising:
selecting a thread included in an application program; wherein the thread includes a plurality of instructions;
determining, based on a predetermined criterion, an execution scheme for each instruction in the thread, wherein the execution scheme for each instruction in the thread is one of: an effective execution scheme and a non-effective execution scheme, wherein the effective execution scheme has an execution time that is uniform, and wherein the non-effective execution scheme has a delayed cycle included and has an execution time that is non-uniform;
generating an effective progress index (EPI) based on an effective progress counter (EPC) that accumulates an execution time of an instruction determined to have an effective execution scheme, and does not accumulate an execution time of each instruction determined to have a non-effective execution scheme; and
generating a kernel progress index (KPI) by accumulating a cycle expended to operate a system kernel while the thread occupies a processor and the thread is executed, and by not accumulating an execution time of each instruction determined to have an effective execution scheme.

17. The method of claim 16, wherein an operation of the EPC is controlled by a hardware non-effective execution (HWNE) signal that executes an instruction via the non-effective execution scheme at an instruction level of a processor based on hardware, or a software non-effective execution (SWNE) signal that executes a function via the non-effective execution scheme at a function level including instructions based on software.

18. The method of claim 16, further comprising:
storing, in a memory, the EPI corresponding to a thread for each thread; and
copying a current value of the EPC to be the EPI in the memory when the thread is in a running state.

19. The method of claim 16, further comprising:
copying a value of the EPC to be the EPI in a memory at a point in time at which a first thread context-switches to a second thread; and
loading the EPI copied in the memory to the EPC in response to the second thread context-switching back to the first thread.

20. A method for thread progress tracking, the method comprising:
selecting a thread prepared according to an instruction to be executed on a scheduler;
setting an effective progress index (EPI) stored in the thread to an initial value of an effective progress counter (EPC), and setting a kernel progress index (KPI) stored in the thread to an initial value of a kernel progress counter (KPC);
determining whether a flag value set to indicate that a non-effective function in use is set in a thread control block of the thread;
suspending the EPC by setting a software non-effective execution scheme (SWNE) signal, and operating the KPC by setting a kernel progress software (KPSW) signal when the flag value is set; and
correcting an increment of an EPC not used for effectively executing code of the thread, operating the suspended EPC by clearing the SWNE signal, and suspending the KPC by clearing the KPSW signal when the flag value fails to be set.

21. A method for thread progress tracking, the method comprising:
suspending an effective progress counter (EPC) by setting a software non-effective execution scheme (SWNE) signal, and operating a kernel progress counter (KPC) by setting a kernel progress software (KPSW) signal in response to a schedule event occurring in a thread in a running state;
storing a value of the suspended EPC to be a value of an effective progress index (EPI) in a memory in response to a context switch event occurring in a state in which the EPC is suspended; and
correcting an increment of an EPC not used for effectively executing code of the thread, operating the suspended EPC by clearing the SWNE signal, and suspending the KPC by clearing the KPSW signal in response to the schedule event being terminated in a state in which the EPC is suspended.

* * * * *